United States Patent
Gil et al.

(10) Patent No.: US 8,639,683 B2
(45) Date of Patent: Jan. 28, 2014

(54) METHOD FOR DATA ANALYSIS AND DIGITAL FORENSICS AND SYSTEM USING THE SAME

(75) Inventors: Youn Hee Gil, Daejeon (KR); Joo Young Lee, Daejeon (KR); Su Hyung Jo, Daejeon (KR); Young Soo Kim, Seoul (KR); Keon Woo Kim, Daejeon (KR); Sang Su Lee, Daejeon (KR); Woo Yong Choi, Daejeon (KR); Sung Kyong Un, Daejeon (KR); Do Won Hong, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 96 days.

(21) Appl. No.: 13/282,078

(22) Filed: Oct. 26, 2011

(65) Prior Publication Data

US 2012/0109969 A1    May 3, 2012

(30) Foreign Application Priority Data

Oct. 27, 2010   (KR) .................. 10-2010-0105346

(51) Int. Cl.
   *G06F 7/00* (2006.01)
   *G06F 17/30* (2006.01)
(52) U.S. Cl.
   USPC .......................................... 707/711; 707/741
(58) Field of Classification Search
   None
   See application file for complete search history.

(56) References Cited

U.S. PATENT DOCUMENTS

| | | | | |
|---|---|---|---|---|
| 7,640,323 | B2 * | 12/2009 | Sun | 709/219 |
| 7,899,882 | B2 * | 3/2011 | Shannon et al. | 709/217 |
| 8,176,557 | B2 * | 5/2012 | Adelstein et al. | 726/23 |
| 2009/0083184 | A1 | 3/2009 | Eisen | |
| 2009/0089361 | A1 | 4/2009 | Womack et al. | |

FOREIGN PATENT DOCUMENTS

| | | |
|---|---|---|
| EP | 1006466 A2 | 6/2000 |
| KR | 10-0519599 | 10/2005 |
| KR | 10-0705412 | 4/2007 |

OTHER PUBLICATIONS

Chang, Hai Jin, "Development of a Web-based Digital Notary System Conforming International Standards," vol. 5 (1):16-20 (2004).

* cited by examiner

*Primary Examiner* — Uyen Le
(74) *Attorney, Agent, or Firm* — Nelson Mullins Riley & Scarborough LLP (57) ABSTRACT

A system and method for data analysis and digital forensics is provided. The system for data analysis and digital forensics may include: an online data forensic server for collecting and analyzing usage history information from an object device, which is subject to data collection, downloading and collecting data on the Internet based on the usage history information, requesting issuance of a timestamp token for the collected data, and receiving the issued timestamp token; a timestamp token issuing server for issuing the timestamp token for the collected data in response to the request for issuance of the timestamp token and proving the issued timestamp token to the online data forensic server; and a storage device for storing the collected data.

9 Claims, 5 Drawing Sheets

METHOD FOR DATA ANALYSIS AND DIGITAL FORENSICS AND SYSTEM USING THE SAME

CROSS-REFERENCE TO RELATED PATENT APPLICATION

This application claims the benefit of Korean Patent Application No. 10-2010-0105346, filed on Oct. 27, 2010, in the Korean Intellectual Property Office, the disclosure of which is incorporated herein in its entirety by reference.

BACKGROUND OF THE INVENTION

1. Field of the Invention

The present invention relates to a method for data analysis and digital forensics and a system using the same and, more particularly, to a method for data analysis and digital forensics and a system using the same, which can utilize data collected via the Internet as digital evidence.

2. Description of the Related Art

The history of Internet connections collected based on information of visited homepage on web history and registry may be closely related to operations performed by a user in the past and behaviors of the user.

Moreover, in the case of a suspect of a certain crime, clues to solve the crime may be found from the contents of emails which were sent and received for some time before the crime. In the case of civil crimes as well as criminal offenses, the analysis of the contents of emails is useful. Especially, in the case of crimes related to leakage of confidential information from a company, when a mail server in the corresponding company is used, the emails may be monitored in real time with a filtering function of an internal monitoring program or security program or the evidence of the crime may be easily released to the public at any time, and thus untraceable emails of external portal sites are most likely to be used instead of the use of the internal emails. Thus, to collect and analyze the contents such as sent and received mail boxes, attachment files, etc. based on webmail information of the suspect is necessary to solve the crimes.

In addition, in the case of personal blogs, detailed contents such as personal information, routine activities, etc. are included therein, and thus if there is a blog administered by an object of investigation, it is necessary to investigate the corresponding blog. Occasionally, when a closed cafe (i.e., a cafe operated by a portal site) is administered by the object of investigation or when there is a cafe which the object of investigation actively participates, it is necessary to analyze and investigate the cafe postings in which information related to the crime may exist.

In previous criminal investigations, a method of visiting the corresponding web pages one by one based on the suspect's web history to identify the contents of the web pages, thus analyzing such online data. However, if where there are numerous sites that the suspect visited or if an effective search needs to be performed in a shorter time, a method of obtaining online data in advance, generating index data for the corresponding data, and then performing search and analysis based on the generated index data may be more useful.

For example, in the case of email analysis systems, e-discovery products in USA (such as Clearwell produced by Clearwell Systems, EnCase eDiscovery produced by Guidance Software, Inc. etc.) provides the functions of loading mail box files from Outlook or Outlook Express, analyzing and retrieving the mail files after generating indexes. In the case of USA, there is a digital discovery system such that when a civil suit such as a conflict between companies is filed, it is mandatory to provide evidence related to the incident before legal battles and to provide data required by the counterpart or the court. Nowadays, most of the data newly generated are usually stored in digital format, and even the hard disc capacity of a personal computer exceeds the terabyte level. Thus, it is very difficult to search for data related to the incident from a huge amount of data for analysis within a given time. In order to solve this problem, many alternative products for e-discovery have been released, and it is the fact that these products have attracted much attention in Europe and Asia as well as USA at present.

However, most of these products are focused on providing a technique of extracting valid data from data stored in the hard disk or data collected previously and analyzing the data effectively. That is, with the use of these products, it is very difficult to analyze data existing online, and especially it is impossible to download and analyze webmail in real time.

Anyone can access the online data through the Internet, and thus, if there is evidence related to the incident, it can be found easily. However, such evidence can be deleted or changed by a person who is authorized such as a writer or server administrator, and thus care should be taken to keep the evidence.

Figure 1:
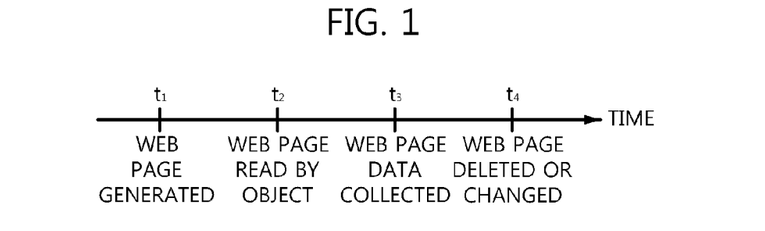
FIG. 1 is a conceptual diagram illustrating the problems that can occur during collection of online data.

FIG. 1 is a conceptual diagram illustrating the problems that can occur during data collection.

For example, referring to FIG. 1, it is assumed that an object of investigation read a web page, which was generated at a certain time (t1) in the past, at a certain time after it was generated.

After the occurrence of an incident, if the object of investigation is identified as a suspect, an investigate can confirm that the suspect read the corresponding web page at a time (t2) by personal investigation against the suspect (such as investigation of records of the computer used by the suspect) and can easily collect data from the corresponding web page at a time (t3).

Here, the meaning of the collection is to copy the web page stored as an html file and move it to a local hard disk. However, in some cases, it is possible to store only important information such as a main text, for example, in the hard disk and replace non-critical data such as banner advertisements, images, etc. with links. Moreover, the analysis of the corresponding web page allows the investigator to obtain evidence that the corresponding web page is associated with the incident. However, the related postings may be deleted or changed at a time (t4) intentionally to conceal the incident or due to an unexpected cause after the time (t3) of the collection of the data. In this case, although a copy identical to the original web page was acquired at the time of collection, there is no way to prove that the contents of the acquired copy is the same as those of the original and even whether the original which is the same as the copy existed in the past.

Thus, to prove the existence of data at the time of collection and to confirm the change of the contents after the time of collection are necessary to solve the related dispute.

SUMMARY OF THE INVENTION

The present invention has been made in an effort to solve the above-described problems associated with prior art, and an object of the present invention is to provide a method for online data collection, analysis, and digital forensics, which can collect internet data based on usage history information of an object of investigation and prove the existence of the internet data.

Another object of the present invention is to provide a system for online data collection, analysis, and digital forensics, which can collect internet data based on usage history information of an object of investigation and prove the existence of the internet data.

According to an aspect of the present invention to achieve the object of the present invention, there is provided a system for data analysis and digital forensics, the system comprising: an online data forensic server for collecting and analyzing usage history information from an object device, which is subject to data collection, downloading and collecting data on the Internet based on the usage history information, requesting issuance of a timestamp token for the collected data, and receiving the issued timestamp token; a timestamp token issuing server for issuing the timestamp token for the collected data in response to the request for issuance of the timestamp token and proving the issued timestamp token to the online data forensic server; and a storage device for storing the collected data.

The usage history information may be collected using internet usage history information and/or system registry information of the object device.

The online data forensic server may comprise: an internet usage history collector for collecting an internet usage history from an object device of investigation; a parser for parsing the internet usage history collected by the internet usage history collector; an online data collector for collecting online data from the Internet based on the internet usage history parsed by the parser; a timestamp token requester for requesting issuance of a timestamp token for the collected online data to an outside timestamp token issuing server; a text document filter for extracting valid text data from the online data collected by the online data collector; an index extractor for extracting a meaningful index from the text data extracted by the text document filter; an index database generator for generating an index database based on a correlation between the index extracted by the index extractor and the online data collected by the online data collector; an index-based searcher for receiving an index, searching for online data corresponding to the index from the index database, and outputting the result; and a timestamp token verifier for verifying the validity of the issued timestamp token.

The timestamp token may comprise a message digest, generated by a hash function with respect to the collected data, and information related to a time when the collected data exists.

The storage device may comprise an online data storage for storing the collected online data and a timestamp token storage for storing the timestamp token.

According to another aspect of the present invention to achieve the object of the present invention, there is provided an online data forensic server, comprising: an internet usage history collector for collecting an internet usage history of an object device of investigation designated by a user; a parser for parsing the internet usage history collected by the internet usage history collector; an online data collector for collecting online data from the Internet based on the internet usage history parsed by the parser; a timestamp token requester for requesting issuance of a timestamp token for the collected online data to an outside timestamp token issuing server; a text document filter for extracting valid text data from the online data collected by the online data collector; an index extractor for extracting a meaningful index from the text data extracted by the text document filter; an index database generator for generating an index database based on a correlation between the index extracted by the index extractor and the online data collected by the online data collector; an index-based searcher for receiving an index from the user, searching for online data corresponding to the index from the index database, and outputting the result; and a timestamp token verifier for verifying the validity of the issued timestamp token.

According to still another aspect of the present invention to achieve the object of the present invention, there is provided a method for data analysis and digital forensics, the method comprising: an internet usage history obtaining step for collecting an internet usage history from an object device of investigation; an online data collecting step for collecting online data from the Internet based on the internet usage history collected in the internet usage history obtaining step; a timestamp token issuing step for issuing a timestamp token for the collected online data from an outside timestamp token issuing server; a text document filtering step for extracting valid text data from the online data collected in the online data collecting step; an index extracting step for extracting a meaningful index from the text data extracted from the text document filtering step; and an index database generating step for generating an index database based on a correlation between the index extracted in the index extracting step and the online data collected in the online data collecting step.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B etc. may be used herein to describe various elements, these elements should not be limited by these terms. These terms are only used to distinguish one element from another. For example, a first element could be termed a second element, and similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

Figure 2:
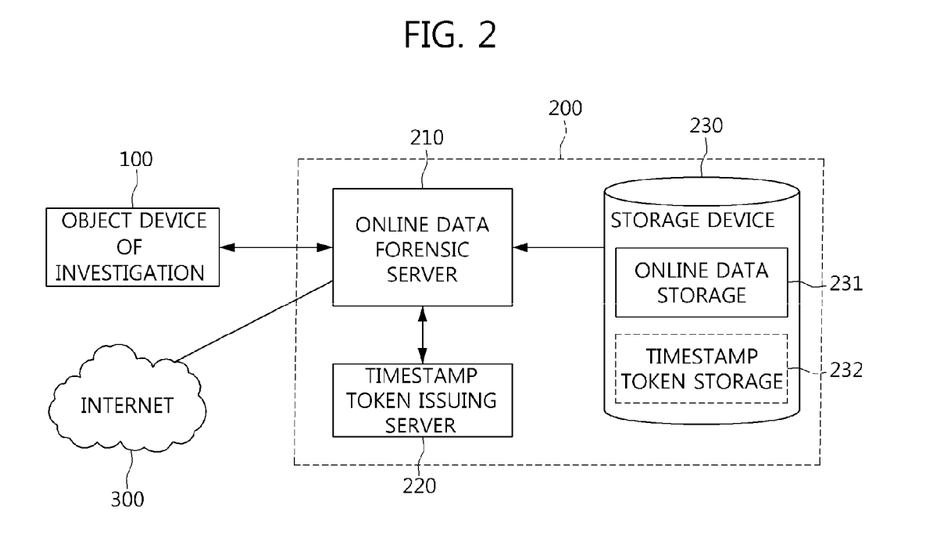
FIG. 2 is a block diagram illustrating the configuration of a system for data analysis and digital forensics in accordance with an exemplary embodiment of the present invention.

FIG. 2 is a block diagram illustrating the configuration of a system for data analysis and digital forensics in accordance with an exemplary embodiment of the present invention.

Referring to FIG. 2, the system 200 for data analysis and digital forensics in accordance with an exemplary embodiment of the present invention may comprise an online data forensic server 210, a timestamp token issuing server 220, and a storage device 230.

The online data forensic server 210 serves to collect and analyze usage history information from an object device 100 which is subject to data collection, to download and collect data on an internet 300 based on the usage history information, to request issuance of a timestamp token for the collected data, and to receive the issued timestamp token.

Here, the object device 100 is an object from which the range of data to be collected through the Internet is determined and may be any type of device such as PC, notebook, PDA, smart phone, etc., for example, which is used by a suspect as an object of investigation and can access the Internet, and in which the history of internet usage is stored.

Thus, the usage history information may contain various information such as internet usage history information (e.g., web history) remaining in the object device, system registry information managed by an operating system (OS), cookie files, etc.

Moreover, the process of collecting the data on the Internet based on the collected usage history information may represent a process of downloading data on an Internet web page browsed by the object device based on above-described internet usage history information, for example. However, the online data forensic server 210 according to the present invention requests issuance of a timestamp token, which can prove that the downloaded data exists on the corresponding web page at the time of download, to a separate timestamp token issuing server 220 at the same time when the data on the Internet is downloaded.

The timestamp token issuing server 220 serves to receive the request for issuance of the timestamp token issue for the downloaded data from the online data forensic server 210, to issue a timestamp token corresponding to the request, and to provide the issued timestamp token to the online data forensic server 210.

Here, the "timestamp token" may comprise a message digest, generated by a hash function with respect to the collected data for which the issuance of the timestamp is requested, and information related to a time when the collected data exists.

The "timestamp token issuance" performed by the timestamp token issuing server 220 is a kind of electronic notary and means a method performed by a trusted third party to prove that a certain electronic document existed at a certain time in the past. That is, the "timestamp token issuance" means a service performed by a trusted institution to issue timestamp information with respect to a specific document and prove that an object document including a digital signature existed at a certain time in the past. Thus, the timestamp token issuing server 220, the online data forensic server 210, and the storage device 230, which constitute the system 200 for data analysis and digital forensics in accordance with the present invention, may be operated by different entities. That is, it means that a competent authority may manage the timestamp token issuing server 220 for the digital signature.

The storage device 230 may comprise an online data storage 231 and a timestamp token storage 232. The online data storage 231 and the timestamp token storage 232 may be implemented as various types of databases, and the collected online data and the received timestamp token may be stored together in a single storage depending on the configuration of the data. On the other hand, the storage device 230 may comprise only the online data storage 231, except for the timestamp token storage 232, and the timestamp token may be stored in the timestamp token issuing server 220 or a separate storage area managed by the timestamp token issuing server 220. That is, it means that the storage of the issued timestamp token itself may be performed by a timestamp token issuing server managed by a competent authority so as to prevent the possibility of falsification of the issued timestamp token.

However, the timestamp token proving that the collected online data and the corresponding online data coexisted on the web page, from which the corresponding online data is collected, at the time of collection should be stored based on the correlation between them.

Meanwhile, the online data forensic server 210 may comprise a variety of components, each of which collects a usage history from the object device 210 to be subject to data collection, collects data from the internet 300, or analyzes the collected data to form a database. These components may be configured in various forms according to exemplary embodiments.

Figure 3:
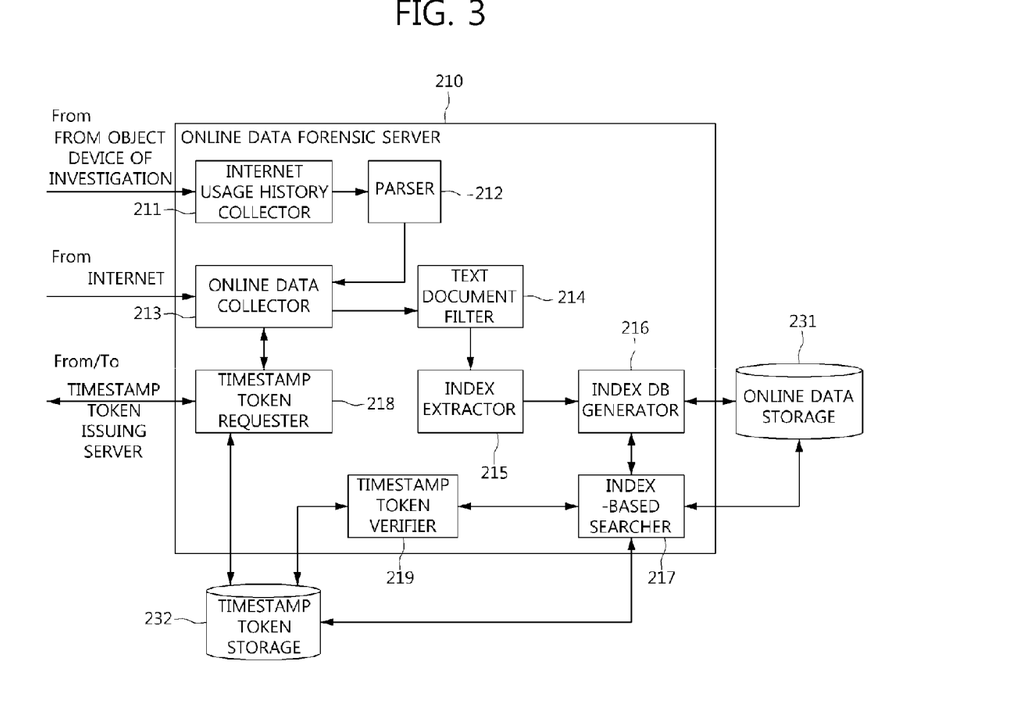
FIG. 3 is a block diagram illustrating the configuration of an online data forensic server included in the system for data analysis and digital forensics in accordance with an exemplary embodiment of the present invention.

FIG. 3 is a block diagram illustrating the configuration of an online data forensic server included in the system for data analysis and digital forensics in accordance with an exemplary embodiment of the present invention.

Referring to FIG. 3, the online data forensic server 210 may comprise an internet usage history collector 211, a parser 212 for parsing the internet usage history, an online data collector 213 based on the internet usage history, a text document filter 214 for extracting valid text data from the collected online data, an index extractor 215 for extracting a meaningful index from a file, an index database generator 216 for generating an index database based on a correlation between the index extracted by the index extractor and the online data collected by the online data collector, and an index-based searcher 217 for searching for a corresponding document in the index database using the index and informing the location of the corresponding document.

The online data forensic server 210 may further comprise a timestamp token requester 218 for sending a request for issuance of a timestamp token for the collected online data to the timestamp token issuing server 220 and a timestamp token verifier 219 for verifying the validity of the issued timestamp token.

The internet usage history collector 211 serves to collect the usage history information from the object device to be subject to data collection and to analyze the collected usage history information. Here, the object device and the usage history information have been described in detail in the description of the online data forensic server 210 with respect to FIG. 2, and thus descriptions thereof will be omitted.

The parser 212 serves to parse the above-described usage history information. The usage history information such as the internet usage history, system registry, etc. may be constructed in a proper format and syntax according to the type of internet browser and OS used by the corresponding object device. Thus, the parser 212 serves to parse the collected usage history to extract meaningful internet usage histories based on the characteristics of the collected usage history information and the object device 100 from which the corresponding usage history information is collected.

Meanwhile, the similarity and difference between the system and method provided by the present invention and the conventional method for internet information search will be described briefly prior to the detailed description of the online data collector 213, the text document filter 214, the index extractor 215, the index database generator 216, and the index-based searcher 217.

The system and method for digital forensics according to the present invention may belong to the field of online data search for digital forensics and the field of internet information search due to the fact that the data on the Internet is downloaded to generate indexes in advance and then the search is performed based on the indexes. That is, the internet information search means the collection of data distributed on the Internet using a technology such as a web robot, for example, the formation of indexes, and the keyword search using the indexes. The web robot is a program which recursively searches for all cited documents by automatically tracking a hypertext structure of a web to collect data existing on the web.

Moreover, in the internet information search, to rapidly and accurately search for the documents collected by the web robot, after extracting important keywords of the documents, the correlation between the extracted keywords or documents is defined and stored in a storage, and then the search is performed. For example, the "internet information search" is a function provided by portal sites, and the internet information search services are provided by Naver, Daum, etc. in Korea and Yahoo, Google, etc., using their own search engines. However, these search engines aim at a massive amount of data existing on the Internet and perform indexing and updating operations for the data obtained by repeating the collection, and thus they may not be appropriate as online data search for the purpose of digital forensics.

First, the online data collector 213 may be constructed using a technology such as a web robot as mentioned above. However, the online data collector 213 of the online data forensic server 210, which constitutes the system in this invention, has a difference that the range of data collected based on the internet usage history recorded in the usage history information of the object device 100 is limited since unspecified data widely distributed on the Internet is not collected.

The text document filter 214 serves to extract text data from a document including the text data, image data, sound data, and video data so as to generate indexes from a large amount of online data collected.

The index extractor 215 serves to generate an index database from the text data extracted by the test document filter 214 and to extract keywords, thereby enabling keyword search corresponding to the index search of the user.

Here, the keyword extraction method used by the index extractor 215 may include a morphological analyzer, a stemmer, an n-gram method, etc. The morphological analysis is to analyze a morpheme, which is the smallest meaningful unit, from a phrase which is presented as a bundle of several morphemes, and is a basic method for extracting core keywords from a document. In the search engines, it is most likely that only a specific morpheme such as a noun is used to extract an index only, without using all functions of the morphological analyzer. However, with the use of natural language search, an index in terms of a structural relation between the morphemes and a semantic structure of the morphemes may be extracted. The stemmer is typically used for extracting the root words and is mostly applied to English languages. Due to linguistic characteristics, an agglutinative language like Korean language has a lot of inflections and conjugations, and thus it is problematic to treat the agglutinative language only with a simple stemming algorithm. As a result, the morphological analyzer is mainly used for the Korean language. In the case of English language, the stemmer can be constructed only by applying some simple rules, and thus a fast and efficient system may be constructed. The n-gram method is to extract each syllable as a keyword by analyzing a character string in units of n syllables in a simple manner. Thus, and the index search analyzed by the n-gram method has an advantage that its recall rate is higher than that of the morphological analysis or the stemmer. However, the n-gram method does not consider the relationship between character strings and thus there is a risk of over-analysis. Accordingly, a pretreatment process such as extraction of phrases, deletion of stopwords, etc. may be performed.

Next, the index database generator 216 may generate an index database using a commercially available (regardless of the type such as relational type, object-oriented type, etc.) to store the index information based on the indexes extracted by the index extractor 215 or may generate the index database as a separate file system (file-base) by controlling the file system for speed. A file, in which an index for each data is configured to search for data faster in a place where a large amount of data is managed such as a file system or database, is called an inverted file. In such a file, each key value on each data record is paired with the location of the record designated by the key value. The index database generated by the index database storage 216 in the above manner may be stored in the online data storage 231 of the storage device 230.

Next, the index-based searcher 217 serves to perform the search in response to the user's keyword search request using the index database generated by the index database generator 216 and to provide the search result to the user. Here, the index-based searcher 217 may be configured to use a B+tree, B−tree, tree, patricia tree, etc. to search for the keyword quickly.

Next, the timestamp token requester 218 serves to request issuance of a timestamp token, which can prove the time when the collected online data existed and the existence of the collected online data, to the outer timestamp token issuing server 220 together with the online data collector 213, to receive the timestamp token issued from the timestamp token issuing server 220, and to store the timestamp token together with the online data for the issued timestamp token in the timestamp token storage 232. Meanwhile, the operation of the timestamp token requester 218 will be described in detail with respect to FIGS. 4 and 5 later.

Finally, the timestamp token verifier 219 serves to verify the validity of the issued timestamp token such that the index-based searcher 217 verifies the index database stored in the online data storage 231 and the online data obtained from the online data using the keyword.

If the index-based searcher 217 searches for necessary data from the online data collected using the keyword, the timestamp token verifier 219 may compare the message digest included in the timestamp token of the corresponding collected online data with the message digest of the corresponding online data existing on the Internet at present and, if they are the same, output a confirmation message indicating that the corresponding file has not changed.

At this time, the timestamp token verifier 219 confirms the time when the file for the issued timestamp token was stored in the corresponding timestamp token, thereby confirming that the corresponding file existed online at the time specified by the timestamp token.

Meanwhile, in the case where the issued timestamp token is not stored in the storage device 230 and the timestamp token is stored in the timestamp token issuing server as mentioned above, the timestamp token verifier 219 may have a different role.

That is, if the timestamp token is stored in the storage device 230 managed by the timestamp token issuing server, the timestamp token verifier 219 may transfer the request for verifying the validity of the object file for the timestamp to the timestamp token issuing server, search for the corresponding token in the timestamp token issuing server to receive the message digest in the token, compare the received message digest with the message digest calculated in real time from the object file for the timestamp, and prove the fact that the corresponding file has not changed and the fact that the corresponding data existed on the Internet at the time of verification.

Figure 4:
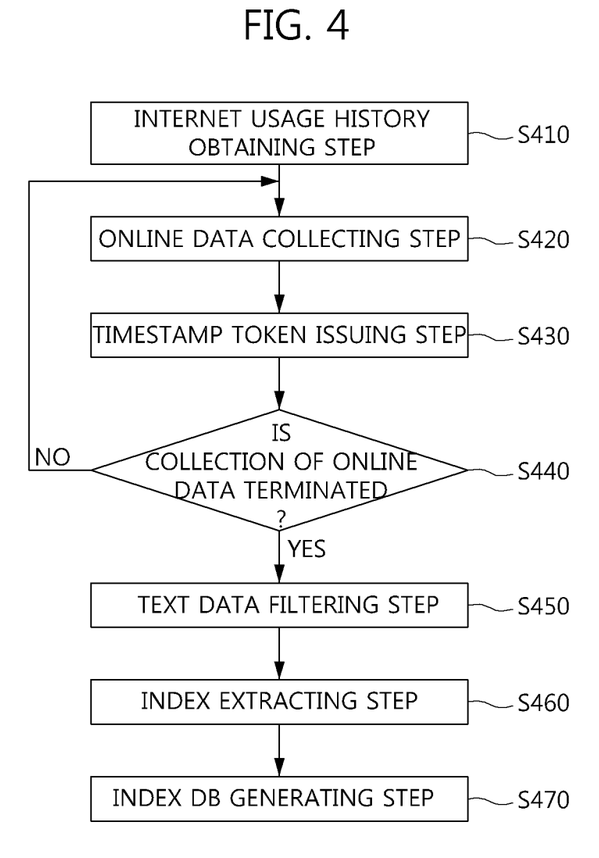
FIG. 4 is a flowchart illustrating a method for data analysis and digital forensics in accordance with another exemplary embodiment of the present invention.

FIG. 4 is a flowchart illustrating a method for data analysis and digital forensics in accordance with another exemplary embodiment of the present invention.

Referring to FIG. 4, the method for data analysis and digital forensics in accordance with an exemplary embodiment of the present invention may comprise an internet usage history obtaining step (S410), an online data collecting step (S420), and a timestamp token issuing step (S430). Here, the online data collecting step (S420) and the timestamp token issuing step (S430) may be performed iteratively until all online data to be collected are collected or until a stop command is received from a user based on the internet usage history of the object device collected in the internet usage history obtaining step (S410) (which is determined in S440).

The internet usage history obtaining step (S410) is to obtain internet usage history and registry information from the object device 100 and to analyze the obtained information, which correspond to the process performed by the internet usage history collector 211 and the parser 212 of the online data forensic server 210 as described above with respect to FIG. 3.

That is, in the internet usage history obtaining step (S410), the usage history information is collected from the object device to be subject to data collection, the collected usage history information is parsed with a predetermined format and syntax, and a meaningful internet usage history is extracted.

Next, the online data collecting step (S420) is to download and collect the corresponding web pages on the Internet based on the collected usage history information. The online data collecting step (S420) may be performed by the above-described online data collector 213 of the online data forensic server 210. The online data collecting step (S420) may be performed using a technology such as a web robot, for example. Here, the online data collecting step (S420) of the present invention has the difference that the range of data collected based on the internet usage history recorded in the usage history information of the object device is limited since unspecified data widely distributed on the Internet is not collected, which is the same as described above.

The timestamp token issuing step (S430) is to issue a timestamp token for the downloaded web page. That is, in the timestamp token issuing step (S430), the issuance of a timestamp token for the downloaded web page is requested to the timestamp token issuing server 220, the issued timestamp token is received from the timestamp token issuing server 220 and verified, and then the verified timestamp token is stored in the timestamp token storage 232 of the storage device 230.

In the process of collecting data from the web pages in the Internet, the timestamp token is issued by the timestamp token issuing server 220 to verify the time of collection, thereby proving that the data has not been falsified from the time of collection.

When the web page information in the Internet is obtained, a typical web page and a web page such as webmail which requires the user's authentication can be distinguished from each other. In the case of the typical web page, only the web page on the corresponding IP address is targeted. However, in the case of the webmail which requires the user's authentication, a sent mail box stored in the webmail, the contents in a received mail box, and attached files are targets in some cases.

Meanwhile, the configuration of the timestamp token issuing step (S430) of the present invention will be described in detail with respect to FIGS. 5 and 6 below.

Figure 5:
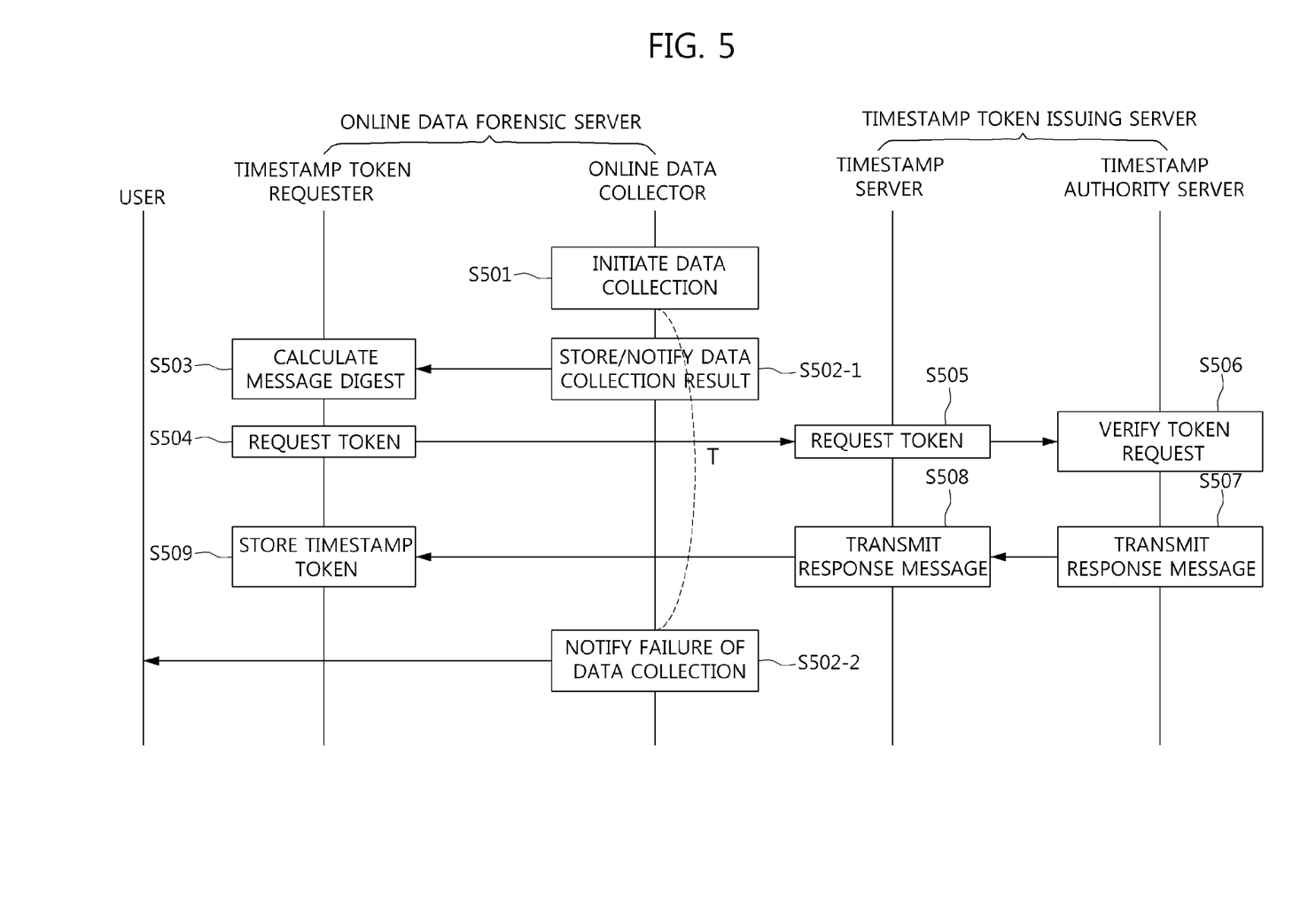
FIG. 5 is a sequence chart illustrating the flow of a process for issuing a timestamp token in the method for data analysis and digital forensics in accordance with another exemplary embodiment of the present invention.

FIG. 5 is a sequence chart illustrating the flow of a process for issuing a timestamp token in the method for data analysis and digital forensics in accordance with another exemplary embodiment of the present invention.

Meanwhile, in the description with respect to FIG. 5, the configuration of the timestamp token issuing server will be functionally separated into a timestamp server and a timestamp authority server and described separately. Here, the timestamp server and the timestamp authority server may be integrated in a single physical device or exist as separate devices. Moreover, the two servers may be collectively called the timestamp token issuing server.

Referring to FIG. 5, in the method for data analysis and digital forensics according to the present invention, a method for issuing a timestamp token for the data such as web pages collected on the Internet may be configured as follows.

First, the online data collector initiates the collection of web pages existing on the Internet or webmail and cafe postings require the user's authentication in response to user's request (S501). If the collection of data is not completed until a predetermined timeout T has elapsed, the user is notified that the collection of data has failed (S502-2). On the contrary, if the connection of data is completed within the predetermined timeout T, the result is stored in the online data storage 231 and the fact is notified to the timestamp token requester 218 (S502-1).

Next, the timestamp token issuing requester 218 performs the process of calculating a message digest for the collected files (S503). When the issuance of the timestamp token is requested, the corresponding file is not directly transmitted for the purpose of privacy protection, and the message digest for the corresponding file is calculated and used, which corresponding to a hash value, for example.

Then, the timestamp token requester 218 transfers the request for issuance of the timestamp token for an object file for the timestamp together with the calculated message digest to the timestamp server (S504), and the timestamp server receives the request and transfers it to the timestamp authority server (S505). The timestamp authority server confirms whether the received request for issuance of the timestamp token is valid (S506), generates a timestamp response message corresponding to the confirmation result, and transmits it to the timestamp server (S507). The timestamp server transmits the timestamp response message received from the timestamp authority server to the timestamp token requester 218 (S508).

Finally, the timestamp token requester 218 verifies the timestamp response message received from the timestamp server (S509). At this time, the timestamp response message including the timestamp token itself may be transmitted to the timestamp token requester 218 such that the timestamp token itself is stored in the timestamp token issuing server 220 or the timestamp response message including only the result of the issuance of the timestamp token may be transmitted to the timestamp token requester 218. If the timestamp token itself is stored in the timestamp response message, the timestamp token requester 218 may store the received timestamp token in the timestamp token storage 232.

Meanwhile, when the issuance of the timestamp token is requested, the corresponding file is not directly transmitted for the purpose of privacy protection, and the message digest for the corresponding file is calculated and used, which corresponding to a hash value, for example. The issuance of the timestamp token is requested for a single file but may be requested for a plurality of files in common.

Figure 6:
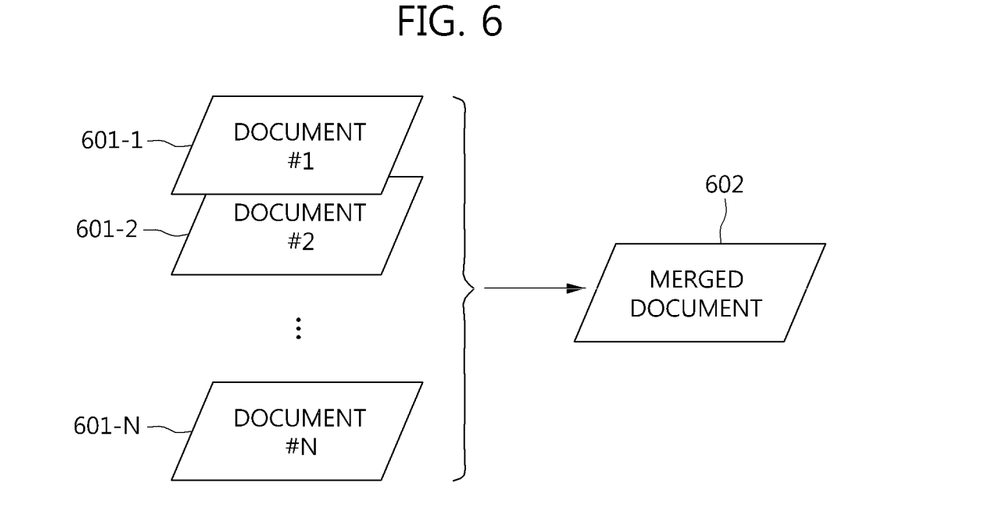
FIG. 6 is a conceptual diagram illustrating an example of a process for issuing a timestamp token for data collected in the method for data analysis and digital forensics in accordance with the present invention.

FIG. 6 is a conceptual diagram illustrating an example of a process for issuing a timestamp token for data collected in the method for data analysis and digital forensics in accordance with the present invention.

Referring to FIG. 6, after merging a plurality of files 601-1 to 601-N into a single file 602 like a tar file, a message digest for the merged single file 602 is calculated to request the issuance of a timestamp token.

Referring back to FIG. 4, the process of extracting internal text data from the received online data is performed in the text data filtering step (S450), the process of extracting the index based on the extracted text data is performed in the index extracting step (S460), and the process of generating the index database using the extracted index is performed in the index database generating step (S470).

The above-described processes of S450 to S470 correspond to the operations performed by the text document filter 214, the index extractor 215, and the index database generator 216, which have been described with reference to FIG. 3, and thus a further description will be omitted.

The obtained online data may be stored in the local storage device or the index database may be constructed directly by extracting the text from a buffer. However, in the present invention, the online data is stored in the local storage device 230. In the case where the online data is stored in the local storage device, there is a burden to store a large amount of data individually, but it has an advantage that the search result can be easily displayed to the user through a display screen even when the system is not connected to the network. Moreover, even if the data on the Internet is deleted or changed, the evidence analysis is possible regardless of the deletion or change since a copy was acquired at the time of collection.

There may be various methods for extracting the text data and extracting the index from the extracted text depending on the applications. The morphological analysis or a dictionary-based method may be used. Otherwise, when the recall rate is important or when the volume of the object data is not so high, a syllable-based analysis method may be used. In the present invention, the method of extracting the index is not limited in particular.

As described above, according to the method and system for data analysis and digital forensics of the present invention, it is possible to generate the index database for the web page visited by the user of the object device of investigation and the user's webmail contents, etc. and analyze the corresponding online data in real time. Moreover, it is possible to easily prove that the collected data existed in the corresponding address on the Internet from a certain time in the past to a time when the data is collected and that the collected data has not been changed from the time when the data is collected.

As above, exemplary embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A system for data analysis and digital forensics, the system comprising:
   an online data forensic server for collecting and analyzing usage history information from an object device, which is subject to data collection, downloading and collecting data on the Internet based on the usage history information, requesting issuance of a timestamp token for the collected data, and receiving the issued timestamp token;
   a timestamp token issuing server for issuing the timestamp token for the collected data in response to the request for issuance of the timestamp token and providing the issued timestamp token to the online data forensic server; and
   a storage device for storing the collected data.

2. The system of claim 1, wherein the usage history information comprises internet usage history information and/or system registry information of the object device.

3. The system of claim 1, wherein the online data forensic server comprises:
   an internet usage history collector for collecting an internet usage history from an object device of investigation;
   a parser for parsing the internet usage history collected by the internet usage history collector;
   an online data collector for collecting online data from the Internet based on the internet usage history parsed by the parser;
   a timestamp token requester for requesting issuance of a timestamp token for the collected online data to an outside timestamp token issuing server;
   a text document filter for extracting text data from the online data collected by the online data collector;
   an index extractor for extracting a meaningful index from the text data extracted by the text document filter;

an index database generator for generating an index database based on a correlation between the index extracted by the index extractor and the online data collected by the online data collector;

an index-based searcher for receiving an index, searching for online data corresponding to the index from the index database, and outputting the result; and a timestamp token verifier for verifying the validity of the issued timestamp token.

4. The system of claim 1, wherein the timestamp token comprises a message digest, generated by a hash function with respect to the collected data, and information related to a time when the collected data exists.

5. The system of claim 1, wherein the storage device comprises an online data storage for storing the collected online data and a timestamp token storage for storing the timestamp token.

6. An online data forensic server, comprising:

an internet usage history collector for collecting an internet usage history of an object device of investigation designated by a user;

a parser for parsing the internet usage history collected by the internet usage history collector;

an online data collector for collecting online data from the Internet based on the internet usage history parsed by the parser;

a timestamp token requester for requesting issuance of a timestamp token for the collected online data to an outside timestamp token issuing server;

a text document filter for extracting text data from the online data collected by the online data collector;

an index extractor for extracting a meaningful index from the text data extracted by the text document filter;

an index database generator for generating an index database based on a correlation between the index extracted by the index extractor and the online data collected by the online data collector;

an index-based searcher for receiving an index from the user, searching for online data corresponding to the index from the index database, and outputting the result; and a timestamp token verifier for verifying the validity of the issued timestamp token.

7. A method for data analysis and digital forensics, the method comprising:

obtaining an internet usage history from an object device of investigation;

collecting online data from the Internet based on the internet usage history;

issuing a timestamp token for the collected online data from an outside timestamp token issuing server;

extracting text data from the collected online data;

extracting a meaningful index from the extracted text data; and generating an index database based on a correlation between the index and the online data.

8. The method of claim 7, wherein the usage history information comprises internet usage history information and/or system registry information of the object device.

9. The method of claim 7, wherein the timestamp token comprises a message digest, generated by a hash function with respect to the collected online data, and information related to a time when the collected data exists.

* * * * *